INVENTORS.
ROBERT S. BARTON
BOBBY A. CREECH
BENJAMIN A. DENT
ERWIN A. HAUCK
WILLIAM M. McKEEMAN
BY Christie, Parker & Hale
ATTORNEYS.

1

3,546,677

DATA PROCESSING SYSTEM HAVING TREE STRUCTURED STACK IMPLEMENTATION

Robert S. Barton, Salt Lake City, Utah, and Bobby A. Creech, Glendora, Benjamin A. Dent, Altadena, Erwin A. Hauck, Arcadia, and William M. McKeeman, Palo Alto, Calif., assignors to Burroughs Corporation, Detroit, Mich., a corporation of Michigan

Filed Oct. 2, 1967, Ser. No. 672,226
Int. Cl. G06f *9/20*
U.S. Cl. 340—172.5 30 Claims

ABSTRACT OF THE DISCLOSURE

A data processing system having a main memory for storing stacks of information and operators for processing. An additional memory has individually selectable display registers each containing a different absolute address of a base of a stack area or other memory storage area. One such display register contains the address of the base of a stack area used to store segment descriptor words. Another display register contains the address of the base of a memory area storing a descriptor word which contains an address of the base of a stack area containing data descriptor words. A segment descriptor contains an address referencing a particular procedure and a data descriptor contains an address referencing a particular stack. A group of registers are provided for storing various information, including reference words. One type of reference word contains a level value designating a particular display register and an index value. An address adder combines various values together to obtain the addresses of desired parameters, control words and reference words. A gating and control unit causes the system to be sequenced in a manner that uses the registers, stacks and adder to obtain the segment and data descriptors which, in turn are used to obtain the desired program procedures and parameters.

CROSS REFERENCES TO RELATED APPLICATIONS

The present invention is related to the tree structured stack implementation utilizing descriptor words to reference procedures and different job stacks stored in the memory of the data processing system. A copending patent application bearing Ser. No. 672,042, filed Oct. 2, 1967, entitled Procedure Entry for a Data Processor Employing a Stack filed in the names of the same inventors as the present application and assigned to the same assignee as the present application is directed to the means by which the data processor employing a stack enters a new procedure. Another copending patent application bearing Ser. No. 672,688, filed Oct. 2, 1967, entitled Stack Mechanism Having Multiple Display Registers, filed in the names of the same inventors as the present application and assigned to the same assignee as the present application is directed to the implementation of the display registers disclosed herein.

BACKGROUND OF THE INVENTION

This invention relates to digital computers and more particularly to data processors employing stack mechanisms.

In computing systems capable of multi job processing,

2 it is normal that several jobs in various stages of completion co-exist in the computer's memory. Often two or more of these jobs are really separate executions of the same program procedure or code, but use different sets of data. This is especially true of the programs supplied by a computer manufacturer. Such programs normally include compilers, input/output formating routines, and other such procedures. When two different jobs are simply executions of the same program procedure, it is highly desirable to allow the jobs to share the same program procedure as is stored in the computer's memory. This concept is known in the computer art as "re-entrant coding." This concept saves memory space in the computer memory that would otherwise be used to store duplicate copies of the program procedure. To this end, programmers have made a strict separation between instructions (which represent the program procedure), and the data (which reflects a particular execution of the program). In other words, the program procedure, including the lists of instructions, are separated so that they are not modified during execution of the program.

Programming and hardware aids have been employed in prior art computers to aid in processing. An example of this is a stack mechanism which operates on a last in, first out, basis. The stack mechanism provides a means for the temporary storage of parameters, references to data, and references to program segments. A separate stack is provided for each job and each job contains references to program procedures stored in memory. The program procedures in turn can be shared by each job as the need arises. For a more complete description of the stack implementation, and the way it is used in accordance with the ALGOrithmic Language, commonly known as ALGOL, reference should be made to the above-identified patent application entitled Procedure Entry for a Data Processor Employing a Stack.

Prior art data processors normally store the program code currently being executed in the main core memory. When the program code is not presently being used, it is temporarily stored into a peripheral storage device such as a disk file. When the program code is needed it is moved back into the main core memory for execution. However, a problem exists in such prior art data processors because it is not readily apparent during the execution of a program whether a particular program code is stored in core memory or in the disk file. Therefore, a rather complicated search is normally required to determine whether the program code is stored in the core memory or in the disk file. This procedure requires an unreasonable amount of execution time and for this reason is undesirable.

SUMMARY OF THE INVENTION

Briefly an embodiment of the invention is in a data processing system having multiple stack storage facilities and includes a memory storing multiple stacks of information, a further one of the stacks contains a plurality of procedure reference words stored in a predetermined sequence each having the address of the base of a different memory area containing a procedure for execution by the data processor. Others of the stacks contain program reference words, each of which contains a reference value indicative of a particular procedure reference word. A register is provided for storing the address of the base of the stack area containing the procedure reference words.

A register is provided for storing an additional reference word for a particular stack and the additional reference word contains a reference value corresponding to one of the program reference words in a stack. Means is coupled to the reference value in the additional reference word for reading out the corresponding program reference word from the memory. A register is provided for storing the read out program reference word. Means is coupled to the reference value in the stored program reference word and the stored base address for combining the same to form the address of the corresponding procedure reference word. Means is coupled to the last mentioned address for reading out the corresponding procedure reference word from the memory. A register is provided for storing at least the base address of the read out procedure reference word for use by the data processing system in locating and executing the corresponding procedure.

There are several advantages of such a stack organization. First, it allows several jobs using the same program procedure to share the same procedure code in one common memory area. Stating it differently, all references to the same program procedure are made through one segment descriptor. This allows the location of the procedure code, whether it be in the core memory or in the disk file, to be indicated right in the segment descriptor for the particular procedure. If, for example, the code for a particular procedure has been brought into main memory for one job, its presence in memory is readily noted right in the segment descriptor, referencing the particular procedure. As a result, it is unnecessary to go through an interrupt operation and special programming to determine whether the desired program procedure is contained in memory as is the case in some prior art computing systems. A substantial increase in available memory space and a decrease in the amount of required computing time results. Thus, regardless of the number of jobs sharing the particular program procedure, there is no need to search the memory.

An embodiment of the invention also in a data processing system having multiple stack storage facilities includes a memory storing multiple stacks of information for processing each stack being assigned a stack number. A memory area contains a stack reference word for each one of the multiple stacks. Each stack reference word contains an address of the base of the corresponding stack. Means is provided for designating the number of a desired stack. Means is provided which is responsive to the designation for obtaining the corresponding stack reference word. Means is provided for storing the base address in the obtained stack reference word for use in reading or writing in the corresponding stack.

By separating the stacks for each job and by using the data descriptors to provide a link to the other jobs in the system, separate computers may work in parallel on the jobs using the corresponding stacks. If during execution of any particular job access is needed to the stack for another job, this is accomplished through the data descriptor for the particular stack. All data descriptors are stored in a common array and for this reason are readily available.

DESCRIPTION OF THE PREFERRED EMBODIMENT

Figure 1:
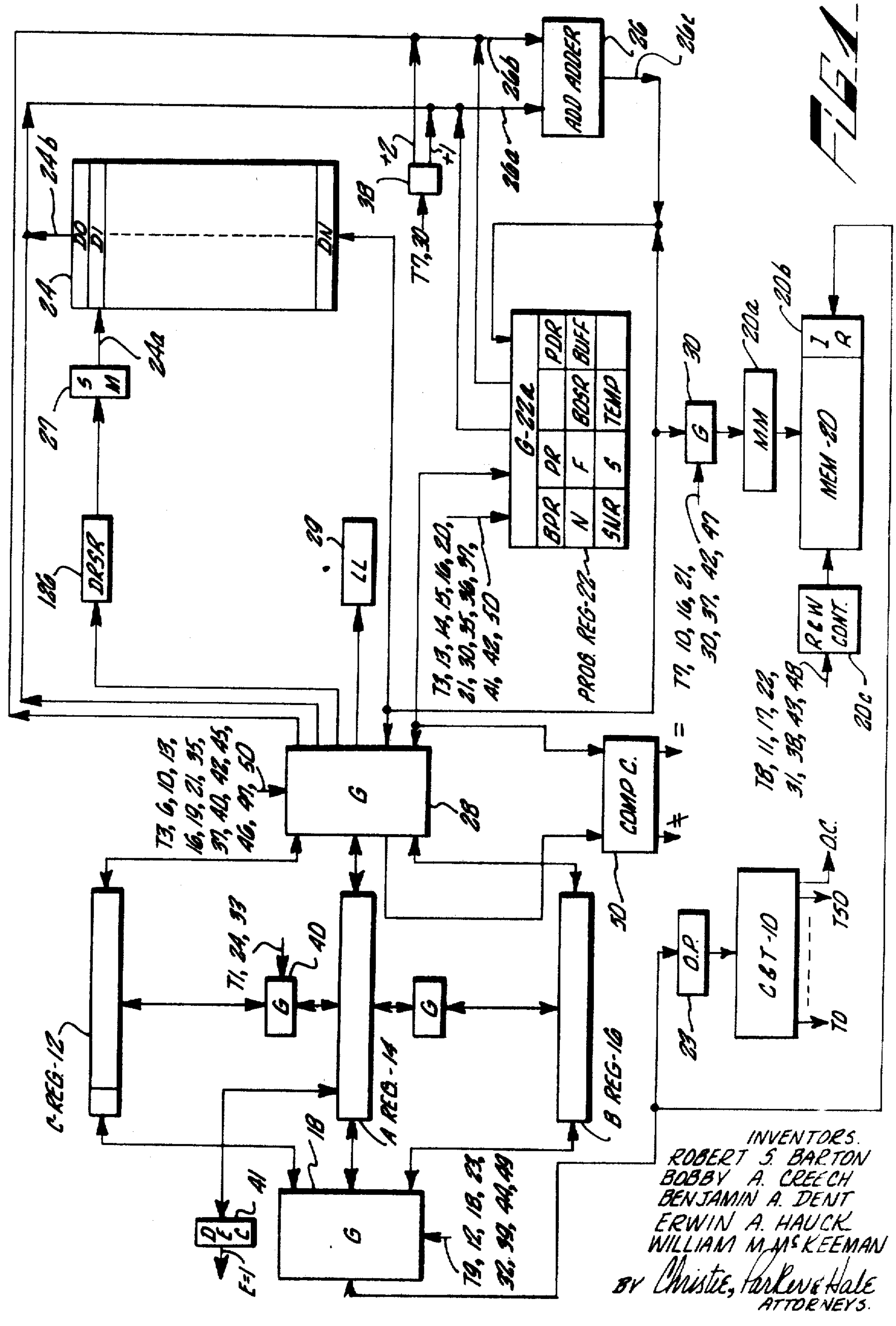
FIG. 1 is a block diagram of a data processing system and embodying the present invention.

Refer now to the major components in the computer system shown in the block diagram of FIG. 1 which embodies the present invention. The computer system contains three registers referred to as the C register 12, the A register 14 and the B register 16. The A and B registers together with a group of storage locations in a memory 20 form a stack mechanism. F and S subregisters in a program register 22 store addresses for the memory locations in memory 20 and are used in keeping track of the memory locations being used as a stack. The A and B registers 14 and 16 form the top two storage locations of the stack and are time shared between stacks. Information is put into the A register and transferred down to the B register, then transferred down from the B register to the storage locations in the memory 20 forming the corresponding stack. This transfer is made via a gate 18 under control of a control and timing unit 10. Information is brought back out of the stack in reverse order and taken out of the top of the stack from the A register. As a word is taken out from the A register the information in the rest of the stack is effectively pushed up one position by appropriately changing the content of the S register, contained in the program register 22, which points at the top of the stack. The complete detail of operation of the stack is not essential for a complete understanding of the operation of the present invention and, therefore, only that part pertinent to the present invention is given. However, such a stack is described in detail in a book entitled "Electronic Digital Systems" by R. K. Richards published in 1966 by John Wiley & Sons, Inc. on pp. 224 through 229.

An operator register 23 stores the operators for execution by the computer system of FIG. 1. The operator register 23 is coupled to the control and timing unit 10 for use in controlling the sequence of operation of the system. Operators are obtained from the memory 20 and are stored into the operator register 23 under control of the PR subregister of the program register 22 in a conventional manner well known in the computer art. The details of this particular operation are not given herein.

The memory 20 is a conventional magnetic core memory system and operates in a manner well known in the computer art. It has an information register **20*b* and an address register (hereinafter referred to as the MM register) 20*a*, and a read and write control unit 20*c*. The address of the memory location into which information is written and read out is controlled by addresses stored in the MM register 20*a***. The operation of the memory system is given in the description of operation.

The system also includes a memory 24 having a group of display registers. The individual display registers are referenced by the symbols D1 through DN. Each of the display registers 24 contains an absolute address of a memory location in the memory 20. To be explained in more detail, each display register that is used contains the absolute address of the beginning of a block of storage in a stack contained in the memory 20. Each address is actually the address of a Mark Stack Control Word (MSCW) (see FIG. 2) which is stored at the beginning of each block of storage.

The display registers 24 are formed of a group of transistor flip-flop circuits and all registers together form a memory. There are a group of input lines 24a, one line for each of the display registers, D1 through DN. A read signal on any one of the lines causes the content of the corresponding register to be read out and applied instantaneously on an output bus 24b.

Associated with the display registers 24 is a selection matrix 27 and a Display Register Selection Registers (hereinafter referred to as the DRSR register) 126. A lexicographical level (*ll*) value, which is defined in more detail hereinafter, is stored in the DRSR register and designates a particular display register. The selection matrix 27 is responsive to a lexicographical level (*ll*) value contained in the register 126 to provide a signal on the corresponding one of the read lines 24a, causing the content of the corresponding display register to be read out onto the bus 24b. The means by which information is written into the display register 24 is not important for an understanding of the present invention and is not explained herein.

Such a memory is disclosed in Pat. No. 3,418,639 entitled Associative Memory Employing Non-Destructive Readout of Binary Elements filed in the name of Edwin S. Lee III.

An address adder 26 is provided and has two input buses 26a and 26b. The input bus 26a is coupled to the output bus 24b of the display register memory 24, and to the output of the program register 22. The input buses 26a and 26b are coupled to a gate 38 which is capable of separately applying signals representing the value 1 to the bus 26a and the value 2 to the bus 26b. The input bus 26b is coupled through a gate 28 to the A, B and C registers 14, 16 and 12. The address adder 26 has an output bus 26c which is coupled to the program register 22 and to the MM register 20a via a gate 30 and to the A, B and C registers 14, 16 and 12 via the gate 28. The address adder 26 is a conventional parallel adder which combines the address signals applied on its input buses 26a and 26b and applies the sum to the output bus 26c.

The program register 22 can be considered as a large register with subregisters therein, as indicated by the reference symbols in FIG. 1. A gate 22a causes information to be written into the appropriate subregisters and causes information to be read out of the appropriate subregisters under control of timing signals from the control and timing unit 10.

Figure 3:
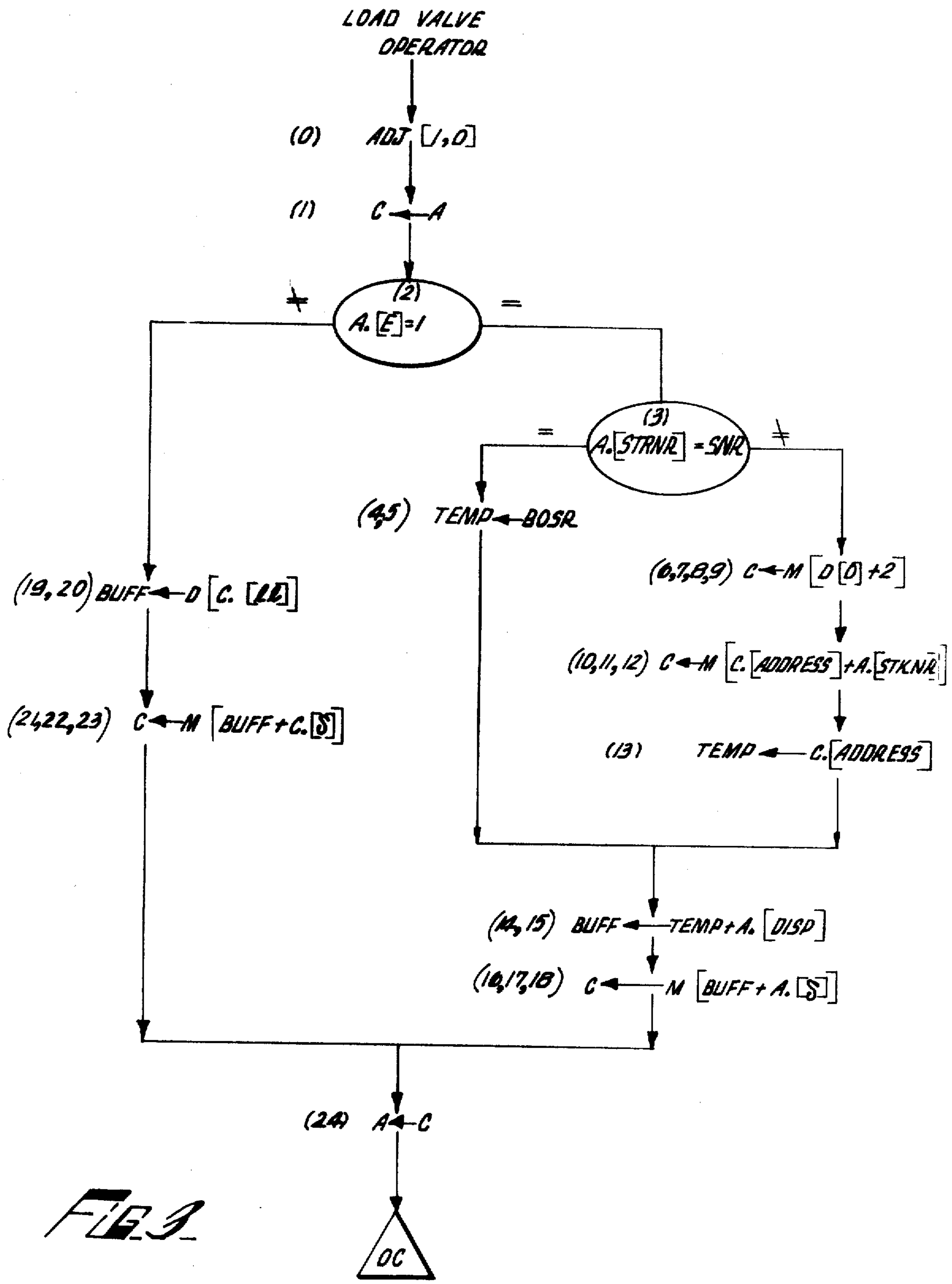
FIG. 3 is a flow diagram illustrating the sequence of operation of the data processing system of FIG. 1 during execution of a Load Operator.
Figure 5:
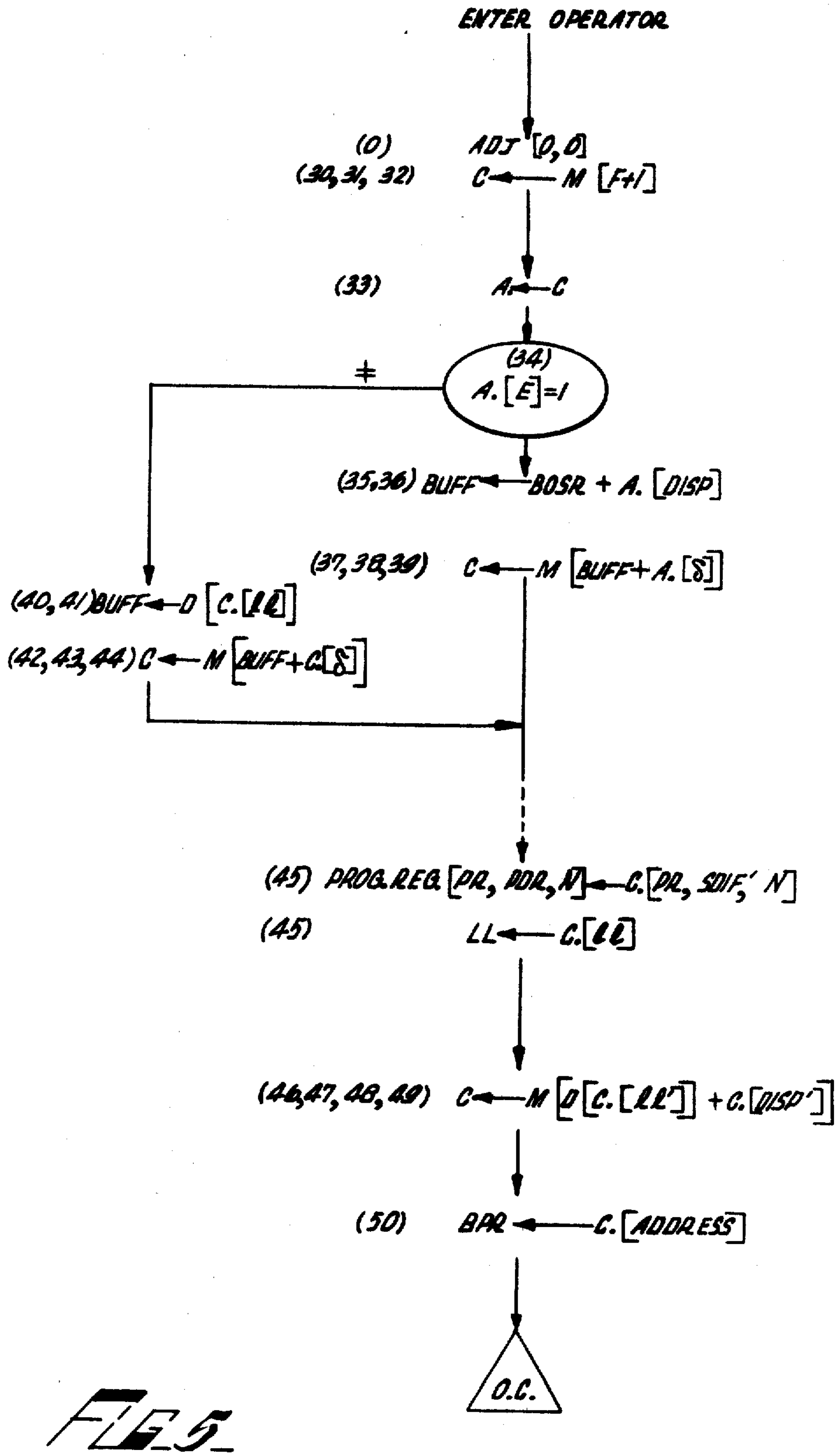
FIG. 5 is a flow diagram illustrating the sequence of operation of the data processing system of FIG. 1 during the execution of an Enter Operator.

The control and timing unit 10 is a conventional timing unit which operates in accordance with the flow diagrams of FIGS. 3 and 5. The control and timing unit 10 provides control signals at the output circuits referenced by the symbols T0 through T50. The sequence with which the timing signals are formed at the output circuits are indicated by the flow diagrams. In order to tie in the flow diagrams of FIGS. 3 and 5 to the timing signals formed by the control and timing unit 10 of FIG. 1, numbers are shown in parenthesis in FIG. 3, i.e. (0), (1), etc. These numbers correspond to the numbers following the letter T for the output circuits of the control and timing unit 10.

A decoder 41 has an input connected to the A register 14 and an output connected to the control and timing unit 10 (later connection is not shown). The decoder provides certain signals indicative of the content of the A register which control the operation of the control and timing unit 10 as described in more detail in the subsequent description of operation.

A comparison circuit 50 is provided to compare a value in the A register 14 with a value in the SNR subregister of the program register 22. The output circuits at which signals are applied indicating equality or inequality are connected (connection not shown in FIG. 1) to the control and timing unit 10 and control the operation thereof.

Parameters are generally located in the stack by a lexicographical level (*ll*) value plus an increment (δ) value. These two values, in combination, are called an address couple. The lexicographical level selects one of the display register 24 and the absolute address in the selected display register is added to the increment value (δ) to give the absolute address of the desired parameter. The means for deriving an absolute address of a parameter using the address couple is disclosed in detail in the above-mentioned patent application entitled Stack Mechanism Having Multiple Display Registers.

Consider now the structure of the words stored in the various stacks in the memory 20. There are five different types of reference words. The names of these reference words and their abbreviations are as follows: Indirect Reference Word (IRW); Stuffed Indirect Reference Word (IRWS); Segment Descriptor (SD); Program Control Word (PCW); and Data Descriptor (DD). A sixth word is a Mark Stack Control Word (MSCW) which is stored at the base of various areas in the stacks. The addresses stored in the display registers 24 are the addresses of mark stack control words. The word structure of the Mark Stack Control Word is shown in the above-identified copending patent application entitled Procedure Entry for a Data Procedure Employing a Stack. However, the details of the word structure of the MSCW are not given herein as they are not necessary for a complete understanding of the present invention. The abbreviations for these words will be used extensively in the following discussion and should be carefully noted.

All of the indirect reference words have a tag (TAG) field which identifies the type of reference word. Thus, there is a unique tag for each different reference word. The IRW and IRWS words each have an E field to distinguish the two words. If the E field contains a "1," it is an IRWS word, whereas if the E field contains a "0," it is a regular IRW. The IRW and the IRWS are similar except that the IRWS has a stack number (STKNR) field and a displacement (DISP) field which are not contained in the IRW. A regular IRW contains a lexicographical level (*ll*) value. Both the IRW and IRWS contain an increment (δ) value. The STKNR field is a value which identifies the number of a stack from which information is to be obtained. The IRWS has two different functions in the embodiment of the invention disclosed herein. One function arises during the execution of an ENTER operator and the second function during the execution of a LOAD VALUE operator. During the execution of a LOAD VALUE operator the IRWS is used to obtained a desired parameter from another stack. During the execution of the LOAD VALUE operator, the DISP field contains a value which, when added to the base of the stack and the total combined with the δ field in the IRWS, provides the address of the desired parameter. During the execution of an ENTER operator an IRWS is used to reference a PCW which, in turn, references an SD in a segment dictionary which, in turn, contains the address of the beginning of a desired program procedure. For an ENTER operator, the DISP field of the IRWS, combined with the content of the BOSR register and the result combined with the δ value results in the address of the PCW.

In an IRW, the lexicographical level (*ll*) value identifies a display register and the increment value (δ) is a value which, when added to the address contained in the identified display register, results in the address of an item in memory.

The segment descriptor contains a P field, a length field, and an address field. The address field is the address of the beginning of a corresponding program procedure. The length field identifies the length of the program procedure. The P field identifies whether the corresponding program procedure is in the core memory or out of the core memory stored in a peripheral storage device such as a disk file unit.

The data descriptor (DD) contains a P field, and an address field. The address field in a DD is the address of the base of tre corresponing job stack. The P field identifies whether the corresponding job stack is stored in the core memory or is stored out in a peripheral storage device such as a disk file.

The program control word (PCW) contains a PR field, an N field, a *ll* field and a SDIF' field. The PCW is used to identify a subroutine or a procedure which is to be executed. The PR field identifies the address of the first operator. The N field identies the state required for the machine. The *ll* field identifies the lexicographical level of the procedure being entered. The SDIF' field is broken down into two values referred to as the *ll'* and δ' fields. The *ll'* field is a value representing a "0" which identifies the display register D0. To be explained, the display register D0 contains the address of the base of a control table. The control table contains a DD which, in turn, contains the address of the base of the stack data descriptor array. The δ' value, when added to the address in the display register D0, gives the address of the data descriptor in the control table.

As mentioned above, segment descriptor (SD) and data descriptor (DD) carry the P field to indicate the presence or absence of the corresponding information in memory and this is a very important feature in a data processing system. The reason is that it gives an indication at one place where the corresponding information is located, i.e. in the main core memory or in a peripheral storage device. In an actual embodiment of the invention means is provided which obtains the information from the peripheral device when the P field indicates the information is located there and causes the information to be brought into the main memory. Thus the indication of where the information is located can be made right in the descriptor in the P field. The means responsive to the P field is not disclosed herein as it is not essential to an understanding of the present invention.

Figure 2:
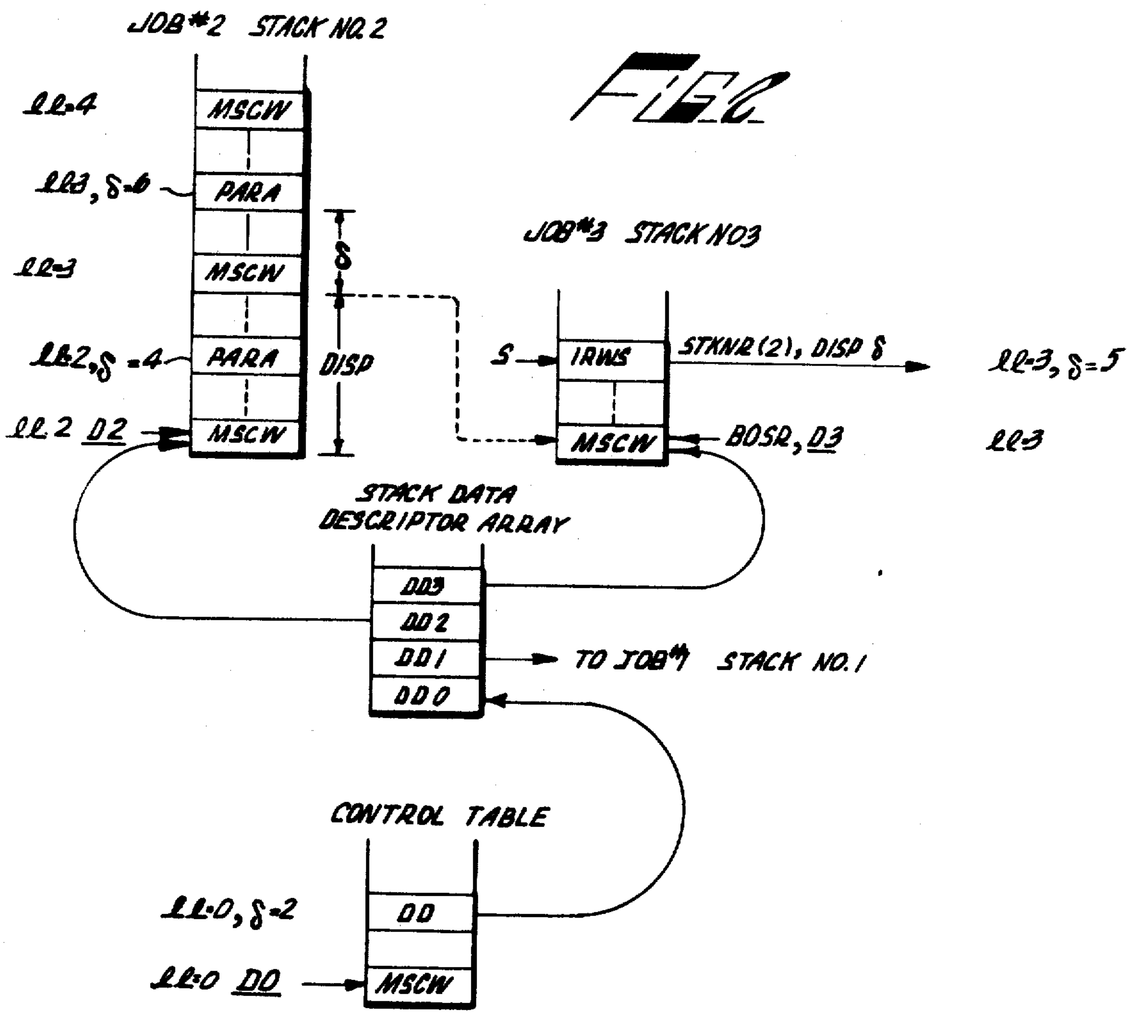
FIG. 2 is a sketch illustrating the organization of the stacks and their linkage to program procedure via the data descriptors, all of which are contained in the main memory of the data processing system of FIG. 1.

Refer now to FIG. 2. FIG. 2 is a sketch illustrating the organization of a number of different job stacks, a stack data descriptor array and a control table in the memory 20. For purposes of illustration, two stacks, referred to as Job Stacks No. 2 and No. 3 are shown linked back to a stack data descriptor array which, in turn, is linked back to a control table. The linkage is indicated by arrows. The stack data descriptor array and control table contains DD's which contain the addresses of the beginning of various memory arrays containing information for use by the data processing system shown in FIG. 1. The DD in the control table contains the address of the base of the stack data descriptor array. The stack data descriptor array contains a DD for each different job program being run in the computer system. Thus, for example DD2 contains the absolute address of the base of the stack area for Stack No. 2; DD3 contains the absoltue address of the base of the stack area for Stack No. 3 etc.

Various kinds of information are placed in the stacks. This information includes reference words and parameters and variables of various types.

An expression will be used in the following description in order to reduce the number of words in the description and simplify the explanation. This expression is a register "points to" a particular item. This expression means that the register contains an address which alone or together with a base address is the absolute address of the item.

FIG. 2 contians symbols indicating various ones of the registers in FIG. 1. Arrows pointing to various parts of the stacks from the register symbols indicate the content of the registers.

Thus, the S register contains the address of the indicated IRWS in stack No. 3; the BOSR and D3 (display register) both contain the address of the MSCW at the base of stack No. 3; D2 contains the address of the MSCW at the base of stack No. 2; D0 contains the address of the MSCW at the base of the control table.

The information in the job stacks are referenced in a number of different ways. One way in which the stack is referenced by lexicographical level (*ll*) values and increment (δ) values. In order to implement this scheme of addressing, the stacks are divided into stack storage areas and the base of each stack storage area contains a MSCW. A lexicographical level (*ll*) value is assigned to each MSCW word in a stack (i.e. $ll=0$, $ll=1$, $ll=2$, etc.) in accordance with a prearranged plan dictated by the rules of ALGOL. Information stored in the stacks following each MSCW is referenced in terms of an increment (δ) value in combination with the lexicographical level (*ll*) value of the preceding MSCW. For example, in FIG. 2, the MSCW at base of stack No. 3 is assigned a lexicographical level (*ll*) value of 3. The IRWS contained at the top of stack No. 3 is assigned a lexicographical level (*ll*) value of 3 and an increment value (δ) of 5. Thus, the IRWS is the fifth word above the MSCW at the base of stack No. 3. The position of the various information in the other stacks can be located in a similar manner as indicated in FIG. 2.

The lexicographical level values are part of an address environment list which are assigned in accordance with the rules of ALGOL. The structure of the address environment list and its purpose is discussed in more detail in the above-identified patent applications entitled Procedure Entry for a Data Processor Employing a Stack and Stack Mechanism Having Multiple Display Registers.

The display registers 24 are set up so that they point at (contain the absolute address of) various MSCW's in accordance with the particular job program currently under execution. In the example of FIG. 2, the portion of the stack starting with lexicographical level (*ll*)2 up to, but not including, lexicographical level (*ll*)3, is shared with both job stack No. 2 and job stack No. 3. Thus, when the system is executing job No. 3 the display registers are set up so that D2 points at the MSCW at the base of job stack No. 2 and so that the display register D3 points at the MSCW contained in job stack No. 3. D0 remains fixed and does not change unless the corresponding stack is moved in memory.

It should also be noted with reference to FIG. 2 that the data processing system of FIG. 1 operates on a multiple stack environment in which there is a system of independent stacks. The stacks begin with a trunk, the trunk being the control table, and then proceeds to form branches which, in turn, may have additional branches. The linkage to the various stacks is through the DD's stored in the stack data descriptor array.

The stack number assigned to each stack identifies the stack and also indicates the position of the corresponding DD's with reference to the base of the stack data descriptor array. The stack number is actually used as a reference value or index value to locate the corresponding DD's. To this end, a stack number value is added to the address contained in the DD located at $ll=0$, $\delta=2$ to obtain the address of the corresponding DD in the stack data descriptor array.

Refer now to FIG. 3 and consider an actual example of the operation of the computer system of FIG. 1, utilizing the tree structured stack illustrated in FIG. 2. The information shown in FIG. 2 can be initially stored in memory in any one of a number of ways well known in the computer art. However, in actual practice, the job stacks are built up during the execution of many data processing operations involving the stacks. FIG. 3 symbolically represents the sequence of operation of the system of FIG. 1 during the execution of a LOAD VALUE operator. FIG. 3 should be followed in the following discussion where an explanation of the symbols will be given.

A LOAD VALUE operator causes a particular parameter, specified by an IRWS which is contained at the top of the stack in the memory 20, to be obtained and placed in the stack for future processing. The parameter may be stored in either the stack currently in use or may be stored in another stack. The following description illustrates the method in which the parameters are obtained from each of these places.

Consider now the actual stack shown in FIG. 2 and assume that the data processing system is currently executing job No. 3 and that the registers have all been set up as indicated in FIG. 2.

Assume now that the control and timing unit 10 causes a LOAD VALUE OPERATOR to read out from the memory 20 and stored into the operator register 23 in a conventional manner known in the computer art. FIG. 3 symbolically represents the operation during state 0 as ADJ(1, 0). This means that the stack is adjusted so that a word is contained in the A register and the B register is adjusted so that it is empty. The stack adjust circuitry and the sequence of operation for such an operation is disclosed in a copending patent application entitled Data Processor Having Operand Tags to Identify as Single or Double Precision filed in the names of Robert S. Barton, Carl B. Carlson, Bobby A. Creech, Benjamin A. Dent, Erwin A. Hauck on Sept. 18, 1967, and given Ser. No. 668,460. Assume now that the A register has been filled with the IRWS shown at the top of stack No. 3 in FIG. 2. It should be noted that the A register is actually the top of the stack, hence the IRWS is now in the actual top of the stack. The control signal at T1 causes the gate 40 to store the IRWS from the A register 14 into the C register 12(C←A). The IRWS is still contained in the A register 14 as well as being stored in the C register 12.

Figure 1A:
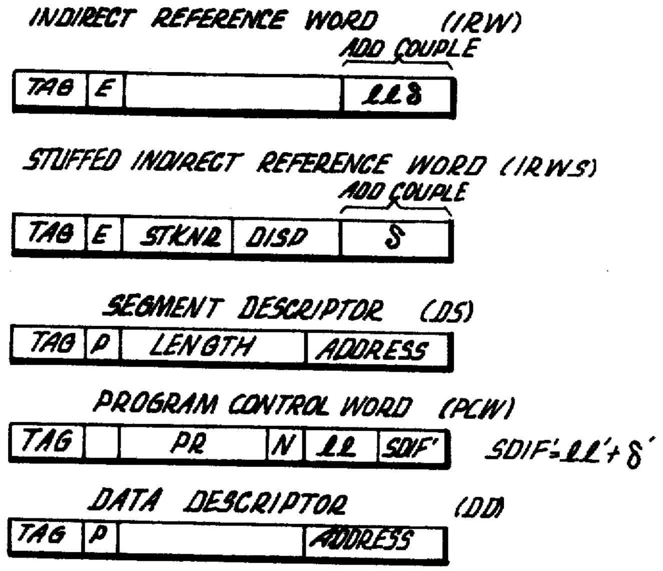
FIG.1A is a sketch showing the word format of the reference words used in the data processing system of FIG. 1.

During state 2 of the control and timing unit 10 a check is made to see if the E field of the IRWS stored in the A register 14 contains a "1" (A[E]=1). If the E field contains a "1," it means that the IRW is an IRWS (see FIG. 1A) and, accordingly, states 3 through 18 are entered. If, on the other hand, the E field contains "0," then it is a regular IRW and states 19 through 23 will be entered. To this end, the decoder 41 provides an output signal indicative of the type of word contained in the A register 14. An IRWS is now contained in the A register therefore a control signal is formed at the E=1 output, indicating an IRWS and causing the control and timing unit to go from state 2 to state 3.

During state 3 a check is made to see whether the stack number contained in the STKNR field of the IRWS in the A register 14 is equal to the number of the stack currently being operated on by the data processor of FIG. 1. The stack number currently in use is contained in the SNR register contained in the program register 22. The STKNR field of the IRWS contains the number of the stack from which it is desired to obtain a parameter. Comparison is made by the compare circuit 50. Assume that the STKNR field of the IRWS has a value of 2 (for stack number 2). Since stack No. 3 is currently in use, the SNR register contains a value of 3, hence the two values are not equal. Continuing with the actual steps of the compare operation, the control signal at T3 causes the gates 28 and 22 to couple the content of the SNR register to one input of the compare circuit 50 and causes the gate 28 to couple the STKNR field contained in the A register 14 to the other input of the compare circuit 50.

Since the two fields are not equal, the compare circuit 50 forms a control signal at the ≠ output. This causes the control and timing unit 10 to go from state 3 to state 6.

During states 6, 7, 8 and 9, the DD contained in the control table in memory is read out and stored into the C register 12. The address of the DD is determined by adding a value of 2 to the address contained in display register D0. To this end, the control signal at T6 causes the gate 28 to store a value of "0" into the DRSR register 126. This in turn causes the selection matrix 27 to read out the address contained in the display register D0, applying it to the input bus 26*a* of the address adder 26. The control signal at T7 causes the gate 38 to apply signals representing a value of 2 to the input bus 26*b*. The address adder 26 adds the address from the display register D0 to the value 2, resulting in the address of the DD contained in the control table (see FIG. 2). The control signal at T7 also causes the gate 30 to store the resulting address from the output of the adder 26 into the MM register 20*a*. The subsequent control signal at T8 causes the read and write control unit 20*c* to initiate a read cycle in the memory 20, causing the DD in the control table to be read out and stored into the IR register 20*b*. The control signal at T9 causes the gate 18 to store the read out DD into the C register 12. Thus, the C register 12 now contains the DD from the control table which, in turn, contains the absolute address (see FIG. 1A) of the base of the stack data descriptor array.

The control and timing unit 10 now goes to states 10, 11 and 12 where a DD contained in the stack data descriptor array is read out from memory 20 and stored into the C register 12. This DD in turn contains the address of the base of the desired job stack. To accomplish this, the address field contained in the DD now stored in the C register is added to the stack number value (STKNR) contained in the IRWS (still stored in the A register) resulting in the address of the desired DD. The STKNR field now contains the value 2 and when added to the address of the base of the stack data descriptor array, provides the address of DD2. To this end, the control signal at T10 causes the gate 28 to couple the address signals (contained in the DD) in the C register 12 to the input bus 26*b*. The control signal at T10 also causes the gate 28 to apply the stack number value (*STKNR*=2) contained in the A register 14 to the input bus 26*a*. The address adder combines the two values together and forms the absolute address of DD2. The control signal at T10 also causes the gate 30 to store the resulting address into the MM register 20*a*. The control signal at T11 causes a read cycle similar to that described hereinabove wherein the data descriptor DD2 is read out of the memory and stored in the information register 20*b*. The control signal at T12 causes the gate 18 to store the DD2 into the C register 12.

At this time the C register 12 contains the data descriptor DD2 which, in turn, contains the address of the base of the desired stack No. 2. During state 13 the address contained in the data descriptor DD2 is stored into the register TEMP temporarily for future use. To this end, the control signal at T13 causes the gates 28 and 22*a* to store the address contained in the C register 12 into the TEMP register of the program register 22.

During states 14 and 15, the address of the base of stack No. 2 contained in the TEMP register is combined with the displacement (DISP) field of the IRWS which is still contained in the A register 14, and the result is stored into the BUFF register. During states 16, 17 and 18 the result contained in the BUFF register is combined with the increment value ($\delta$) and the result is used to address the memory and obtain the desired parameter from stack No. 2.

To this end, the control signal at T14 causes the gate 22*a* to couple the content of the TEMP register to the input bus 26*a* and causes the gate 28 to couple the DISP field in the A register 14 to the input bus 26*b*. The address adder combines the values together and the control signal at T15 causes the gate 22*a* to store the result, formed at the output bus 26*c*, into the BUFF register. The control signal at T16 causes the gate 22*a* to couple the content of the BUFF register to the input bus 26*a* and causes the gate 28 to couple the increment value ($\delta$), contained in the A register 14, to the input bus 26*b*. The address adder 26 combines the two values, resulting in the address of the desired parameter. The control signal at T16 causes the gate 30 to store the result in to the MM register 20*a* and the control signals at T17 and T18 cause the desired parameter to be read out from the memory and stored into the C register 12.

At this point the C register 12 contains the desired parameter which was stored in stack No. 2. However, the parameter must be placed in the top of the stack. As pointed out hereinabove, the R register 14 is actually the top register of the stack, accordingly, the control signal at T24 causes the gate 40 to store the parameter from the C register 12 into the A register 14.

At this point, the control and timing unit 10 goes to the operation complete state (OC) causing a new operator to be stored into the operator register 23. Thus, it should now be apparent that it is possible for one procedure currently in operation utilizing one stack to obtain a parameter in a completely different job stack by the use of the stuffed indirect reference word or IRWS, the control table and the stack data descriptor array.

It should be noted that if the desired parameter were in the same stack and at the addressing environment of the procedure currently being executed, the control and timing unit 10 would have gone from state 2 to states 19 through 23. Under these conditions, the E field contained in the IRW would have been a "0," and hence would not be a "1." Therefore, the decoding circuit 41 would not form a control signal at the E=1 output. The absence of this signal would cause the control and timing unit 10 to go from state 2 to state 19. It should also be noted that under these conditions the IRW (i.e. IRWS) would not be a stuffed type of IRW (i.e. IRWS) and hence the address couple is to be used to form the address of the desired parameter. To this end, the control signal at T19 causes the gate 28 to store the lexicographical level (*ll*) value from the C register into the DRSR register 126. Assuming for purposes of explanation that the lexicographical level value were 3, the address in the display register D3 would then be read out and the address contained therein applied to the input bus 26*a*. Since no other input is applied to the adder 26, the address applied to the input bus 26*a* would be applied unaltered to the output bus 26*c*. The following control signal at T20 causes the gate 22*a* to store the address from the display register D3 into the BUFF register.

During states 21 through 23 of the control and timing unit 10, the address contained in the BUFF register is combined with the increment value (δ) to form the address of the desired parameter and the desired parameter is obtained from memory. To this end the control signal at T21 causes the gate 22*a* to couple the content of the BUFF register to the input bus 26*a* and causes the gate 28 to couple the increment value (δ) from the C register 12 to the input bus 26*b*. The address adder 26 combines the values together to provide the absolute address of a desired parameter in memory. The control signal at T21 also causes the gate 30 to store the resulting address into the MM register 20*a*. The control signals at T22 and T23 cause the desired parameter to be read out from memory and stored into the C register 12.

Following state 23, state 24 is entered where the desired parameter is transferred to the top of the stack in the A register as described hereinabove. It should be apparent then that when the desired parameter is in the same environment, that is in the same stack and in the addressing environment of the procedure currently being executed, the addressing can be done relative to the corresponding display register rather than by going through states 3 through 18.

Another addressing condition should be noted. This addressing condition occurs when an IRWS is used to reference a desired parameter when the desired parameter is contained somewhere within the stack currently in use. Under these conditions, the stack number value in the STKNR field of the IRW is the same as the value contained in a SNR register of the program register 22.

Assume that the control and timing unit 10 is in state 3 and this condition is present. The compare circuit 50 forms a control signal at the "=" causing the control and timing unit 10 to go from state 3 to states 4 and 5. During state 4 the control signal at T4 causes the gate 22*a* to couple the content of the BOSR register to the address adder 26 which in turn applies the address unaltered to the output circuit 26*c*. The control signal at T5 causes the address to be stored back into the TEMP register by the gate 22*a*. At this point the TEMP registers contain the address of the base of the stack currently in operation, namely the content of the BOSR register. Following state 5, states 14 through 18 are entered as described hereinabove where the DISP field and the increment field (δ) are combined with the base address to form the address of the desired parameter and cause it to be stored into the C register. Thus, at the end of state 5, TEMP register is basically at the same point in the operation as the computer system is at the end of state 13.

Another important feature of the present invention is that a number of different job stacks make reference to the same program procedure through a common segment descriptor (SD). A different SD is provided in a stack for each different program procedure it is desired to use in the system. All segment descriptors are combined together in the segment dictionary.

Figure 4:
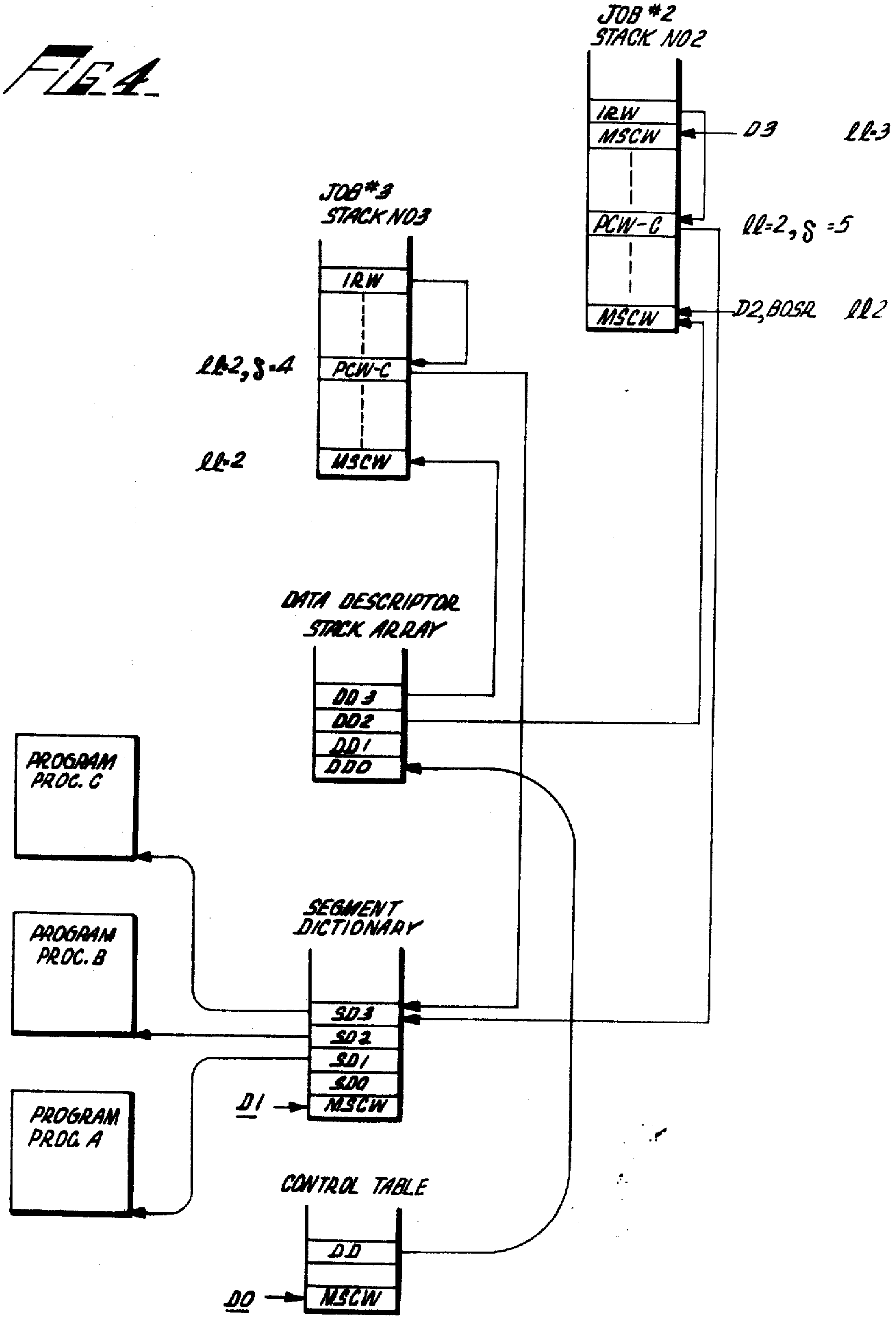
FIG. 4 is a sketch illustrating the stack organiaztion and the way in which the different job stacks are linked through the segment descriptors to the various program procedures.

Consider now an example of operation of the system of FIG. 1 when executing an ENTER operator. The sequence of operation of the system is illustrated symbolically in FIG. 5, and should be followed in the following discussion. The information shown in FIG. 4 can be stored in memory in any one of a number of ways well known in the computer art. In actual practice, the job stacks are built up during a number of data processing operations involving the stacks. Assume now that the display registers are set up as indicated in FIG. 4 and consider the way in which the various job stacks make reference to the desired program procedures. As indicated in FIG. 4, program procedures A, B and C are stored in memory and are linked to segment descriptors SD1, SD2 and SD3, respectively. Also assume that during the use of job stack No. 2 it is desired to call into operation program procedure C. The IRW at the top of stack No. 3 points to the PCW–C for program procedure C. The entrance to program procedure C is entered in response to an ENTER operator.

Assume now that the control and timing unit 10 has caused an ENTER operator to be stored into the operator register 23.

Referring to FIG. 4, the symbols ADJ(0, 0) for state 0 indicate that the two top registers in the stack, the A and B registers, are emptied and their contents stored into memory into the corresponding stack. This occurs during state 0 of the control and timing unit 10 and is done as disclosed in the above-identified patent application entitled Data Processor Having Operand Tags to Identify as Single or Double Precision.

Assume that the A and B registers have now been emptied. During states 30, 31 and 32 the IRW at the top of stack No. 2 in memory is read out and stored in the C register. The control signal at T30 causes the gate 22*a* to couple the address contained in the F register to the input bus 26*b* and causes the gate 28 to apply a "1" value to the input bus 26*a*. The address adder combines the two values and forms the address F+1. The address F+1 is the address of the IRW shown at the top of stack No. 2 in FIG. 4 in the memory. The control signal at T30 also causes the gate 30 to store the address into the MM register 20*a*. The control signals at T31 and T32 cause the IRW contained in the memory location F+1 to be read out from memory and stored into the C register 12, similar to that described hereinabove.

The control signal at T33 causes the gate 40 to store the IRW from the C register 12 into the A register 14 which is the actual top of stack.

During state 34 a check is made to see whether the IRW is a stuffed word (i.e. IRWS). It is not stuffed, therefore, the E field contains a "0" and states 40 through 44 are entered. If the IRW was a stuffed word, then states 35 through 39 would be entered.

Continuing with the present example of operation the control signal at T40 causes the gate 28 to store the lexicographical level (*ll*) value in the IRW stored in the C register into the DRSR register 26. The selection matrix 27 causes the corresponding display register to be read out and the address contained therein applied to the input bus 26*a*. The control signal at T41 causes the gate 22*a* to store the address from the display register into the BUFF register. Assume that the lexicographical level (*ll*) value in the IRW is a 2 and therefore the address now contained in the BUFF register is the address from display register D2. The control signal at T42 causes the content of the BUFF register to be applied to the input bus 26*a* and causes the gate 28 to apply the increment value (δ) in the IRW stored in the C register to the input bus 26*b*. The address adder combines the two and the resulting address is stored into the MM register 20*a* by the gate 30.

Assume that the value in δ field is a 5. Therefore, the address now contained in the MM register is the address of the PCW–C at the *ll*=2, δ=5 shown in stack No. 2 of FIG. 4.

The control signals at T43 and T44 cause the content of the addressed memory location to be read out and stored into the C register 12. Thus, the PCW–C word indicated at *ll*=2, δ=5 in FIG. 5 is now stored in the C register. Thus, at the end of state 44 the C register 12 contains the PCW–C word which in turn contains a reference to a SD which in turn contains the address of the base of the desired program procedure.

In an actual computing machine embodying the present invention a number of intermediate steps may be performed at this point, however, they are not pertinent to a consideration of the present invention and are not explained herein. However, the next step of importance to the present invention occurs during state 45. The control signal at T45 causes the gates 22*a* and 28 to store the content of the PR, SDIF' and N fields of the PCW–C contained in the C register 12 into the PR, PDR and N registers, respectively, of the program register 22. Additionally, the gate 28 causes the lexicographical level (*ll*) value of the PCW–C contained in the C register 12 to be stored in the LL register 29. The purpose of state 45 is to cause the various program registers contained in the system to be set with the new program information contained in PCW–C for use in execution of the corresponding procedure.

Following state 45, states 46 through 49 are entered where the SD corresponding to the desired program procedure is obtained. To this end, the control signal at T46 causes the special lexicographical level (*ll'*) of the PCW–C contained in the C register 12 to be stored into the DRSR register 126. The special lexicographical level value is actually the level value "1" corresponding to the display register D1 in the segment dictionary. The selection matrix 27 causes the content of the display register D1 to be read out and applied to the input bus 26*a*. The control signal at T46 also causes the gate 28 to apply the special δ' field of the PCW–C contained in the C register 12 to the input bus 26*b*. The address adder combines the base address from D1 and δ' value and the resulting address formed at the output of the adder is stored into the MM register 20*a* by the gate 30.

The address contained in the MM register 20*a* is now the address of the desired segment descriptor. The control signals at T48, T49 cause the segment descriptor to be read out of memory and stored into the C register 12.

The control signal at T50 causes the gates 28 and 22*a* to store the address contained in the SD contained in the C register 12 into the BPR register of the program register 22. Thus, the BPR register now contains the address of the base of the new program procedure C and program procedure C can now be executed. The address in the BPR register is the address of the base of the memory area containing procedure C and the content of this register is used in the subsequent execution of procedure C.

The control and timing unit 10 now goes to the operation complete (OC) state where the operation for the ENTER operator is completed and the next operator is read out and stored into the operator register 23.

Returning for a moment to state 34, it will be noted that had the result of the comparison indicated that the IRW word is a stuffed word, then states 35 through 39 could be entered where the DISP and increment values (δ) of an IRWS could be combined to form the address of the corresponding control word and the corresponding program control word would be read out from memory and stored into the C register.

The problems of the prior art and their solution by means of the present invention have been given with reference to the programming language known as ALGOL. However, similar problems exist and the solutions to these problems by means of the present invention is equally applicable to other languages that are smilar to ALGOL. These languages are known as ALGOL-like languages. One example of an ALGOL-like language is known as PL/I and is defined in the report entitled "IBM System 360 Operating System PL/I Language Specifications," published by the IBM Corporation in December 1966 and identified as IBM SRL C–28–6571–3.

Although one example of the present invention has been shown by way of illustration, it should be understood that there are many other rearrangements and embodiments of the present invention within the scope of the following claims.

What is claimed is:

1. A data processing system comprising a plurality of stacks each having a plurality of register means, each stack being assigned a number and the stacks being selectable in a predetermined order corresponding to the value of said numbers, a further plurality of register means each containing a stack reference word for one of said plurality of stacks, such further plurality of register means being selectable in an order corresponding to said numbers, each of said stack reference words containing an identification value identifying the corresponding stack, an additional register means storing an additional reference word having a number value therein corresponding to one of said stack reference words and a displacement value corresponding to a particular register in said stack of registers, means responsive to the stored number value for selecting the corresponding stack reference word and means responsive to the identification value and the displacement value of the selected stack reference word for selecting a particular register means in the corresponding stack.

2. A programmable data processing system having multiple stack storage facilities the combination comprising a memory storing multiple stacks of information for processing, each stack being assigned a stack number, said memory also containing a sequence of memory locations storing a stack reference word for each one of said multiple stacks, each stack reference word containing an address of the base of the corresponding stack, means for storing the address of the beginning of said sequence of memory locations, register means external to memory for storing an additional reference word, the additional reference word containing values representing the number of a stack containing a desired parameter and a reference value, means for storing a program operator, means responsive to said operator for combining the stack number in the stored additional reference word with the stored beginning address to form the address of one of said stack reference words, means responsive to said operator for reading the stack reference word from the memory location which is designated by the last formed address, means responsive to said operator for combining the stack base address in the readout stack reference word with the reference value in the additional reference word to form the address of the desired parameter in the desired stack, and means responsive to said operator for reading the parameter from the memory designated by such parameter address.

3. A data processing system as defined in claim 2 including a register external from the memory which forms the top storage position in a stack currently in use and means for storing the read parameter into such register for use in further processing.

4. A programmable data processing system having multiple stack storage facilities the combination comprising a memory storing multiple stacks of information for processing each stack being assigned a stack number, said memory also having sequential memory locations, each of said sequential memory locations storing a stack reference word for each one of said multiple stacks, each stack reference word containing an address of the base of the corresponding stack, register means external to memory for storing an additional reference word, said additional reference word containing a stack number value corresponding to a stack containing a desired parameter and a parameter reference value identifying the desired parameter within the stack, means for storing a program operator, means responsive to said operator for obtaining the stack reference word from memory corresponding to the stack designated by the stack number value in the additional reference word, means responsive to said operator for combining the stack base address in the obtained stack reference word with the parameter reference value in the additional reference word to form the address of the desired parameter in the corresponding stack, and means responsive to said operator for reading the parameter from memory designated by such parameter address for use by the data processor.

5. A data processing system as defined in claim 2 including a register external from the memory which forms the top storage position in a stack currently in use and means for storing the read parameter into such register for use in further processing.

6. A programmed data processing system having multiple stack storage facilities the combination comprising memory means storing multiple stack of information for processing each stack being assigned a stack number said memory also containing a stack reference word for each one of said multiple stacks, each stack reference word containing an address of the base of the corresponding stack, said stack reference words being stored in sequential memory locations, means for storing the address of the beginning of said sequence of memory locations, register means external to the memory means for storing an additional reference word which contains values representing the number of a stack and a parameter reference value identifying a desired parameter in such stack, means for storing an operator, adder means responsive to said operator for combining the stored stack number value and the stored beginning address of said sequence of memory locations to form the address of one of said stack reference words, memory read means responsive to said operator and the formed address for reading the corresponding stack reference word from the memory means, register means external to the memory means for storing the base address of the readout stack reference word, said adder means additionally being responsive to said operator for combining the stored base address of the stack reference word and the stored parameter reference value to form the address of the desired parameter in the corresponding stack, and means responsive to said operator and to the last named address for reading out the corresponding parameter from the memory means for use in data processing operations.

7. A data processing system having multiple stack storage facilities the combination comprising a memory storing multiple stacks of information, a plurality of procedure reference words stored in a predetermined sequence in a sequence of memory locations and each containing the address of the base of a diffierent area containing a procedure for execution by the data processor, said stacks containing a program reference word therein which contains a reference value corresponding to a particular procedure reference word, means for storing the address of the beginning of the series of memory locations containing said procedure reference words, means for storing an additional reference word for a particular stack, said additional reference word containing a reference value corresponding to one of said program reference words in a stack, means storing the address of the base of a stack area containing a program reference word, means for combining said stored address of the base of a stack area and the reference value in said stored additional reference word for forming the address of a program reference word, means responsive to the address formed by said comibning means for reading out the corresponding program reference word from the memory, register means for storing the readout program reference word, said combining means being responsive to the reference value in the stored program reference word and the stored beginning address for combining the same to form the address of the corresponding procedure reference word, means responsive to the last mentioned address for reading out the corresponding procedure reference word from the memory, and register means for storing the base address of such readout procedure reference word for use by the data processing system in locating and executing the corresponding procedure.

8. A data processing system comprising memory means containing a plurality of stacks of information, and a plurality of procedures for execution, a series of memory locations in said memory means containing a plurality of procedure reference words, one word for each of said procedures and each word containing an address of the base of the corresponding procedure, said stacks each containing a program reference word which contains a reference value corresponding to one of said procedure reference words, means for storing the address of the base of one of said stacks containing a program reference word, means for storing the beginning address of said series of memory locations, a register for storing an additional reference word containing a reference value, means for combining the reference value in said additional reference word with the said address of the base of one of said stacks to form the address of a program reference word, means for obtaining the program reference word corresponding to the last formed address from the memory means, means for combining the reference value in the obtained program reference word with said beginning address of a series of memory locations to form the address of the corresponding procedure reference word, and means for obtaining the procedure reference word from the memory means corresponding to the last formed address, and register means for storing the base address in such procedure reference word and thereby provide a reference to the corresponding procedure during subsequent processing.

9. In a data processing system having re-entrant code facilities the combination comprising, a memory storing a plurality of procedure reference words in a predetermined order in a sequence of memory locations, each procedure reference word containing a value identifying a particular procedure in said memory for execution, said memory additionally storing a plurality of stacks of information each containing a program reference word containing a value corresponding to one of said procedure reference words and corresponding procedure, means for obtaining one of said program reference words in a stack, means for utilizing the value of such program reference word for obtaining the corresponding procedure reference word and means for storing the value in such procedure reference word for use in obtaining and executing the corresponding procedure.

10. A programmable data processing system including a processing mechanism organized for processing information in stacks on a first in, last out, basis, an addressable memory system having stored therein a plurality of independent stacks of information for processing by said processing mechanism on a first in, last out, basis, a stack reference word for each of said stacks stored in said memory system, the stack reference words being stored in sequential memory locations and each stack and corresponding stack reference word being assigned a unique number, means for storing a further absolute address of the base of said stack reference words, means for providing words from a program including a reference word identifying a desired parameter word in any one of said plurality of stacks, said reference word including a number value identifying the desired stack and at least one displacement value referencing the position of the desired parameter in such stack, a register for storing an operator, a first circuit responsive to said operator and to the number in the provided reference word and said further base address for forming the address of a stack reference word and further means responsive to said operator for obtaining from memory the stack reference word identified by the formed address, said first circuit being responsive to said operator for combining said at least one displacement value and the absolute address from the obtained stack reference word to form the absolute address of the desired parameter.

11. In a data processing system operative for processing words of information in a plurality of stacks in which words of information are stored on a last in, first out, basis, a method for obtaining a word of information from any one of a plurality of such stacks including the steps of:

(a) storing in an addressable memory system of the data processing system a plurality of such stacks of words for processing each of said stacks having a unique preassigned number;
(b) storing a signal identifying the number of the one of such stacks currently in use;
(c) storing a first base address of the base of the one of such stacks currently in use;
(d) storing a plurality of stack base addresses, each stack base address being of the base of one of such stacks, the base addresses being stored in addressable memory locations in such addressable memory system in an order corresponding to the numbers assigned to the corresponding stacks;
(e) storing a second base address of the base of said plurality of stack base addresses;
(f) storing a value identifying the number of the stack from which information is desired and at least one incremental value identifying the position of the desired word with reference to the base of the identified stack;
(g) comparing the stored stack number value with the stored current stack number signal;
(h) if an equality is detected in the step of comparing then combining the stored base address of the stack currently in use with said at least one incremental value to form the address of the desired word of information in the stack currently in use;
(i) if an inequality is detected in the step of comparing then combining the second base address with the stack number value forming the address of one of said plurality of stack base addresses and then;
    (1) reading the stack base address from the memory system address identified by the last formed address, and
    (2) combining the last read base address with said at least one incremental value to form the address of the desired word of information from the identified stack.

12. A method according to claim 11 wherein said stacks have a mark stack word at the base of each of a plurality of areas in said stacks, and wherein said incremental value contains a first incremental value identifying the displacement from the base of a desired stack to one of said mark stack words and a second increment value giving the displacement of the desired parameter from such mark stack word, the steps (h) and (i)(2) of combining including the steps of combining both said first and second increment values.

13. In a data processing system operative for processing words of information in a plurality of stacks on a last in, first out, basis, a method for obtaining a word of information from any one of the stacks other than the one currently in use including the steps of:

(a) storing in an addressable memory system of the data processing system, a plurality of such stacks of words for processing each of said stacks having a unique preassigned number;
(b) storing a plurality of stack base addresses, each stack base address being of the base of one of such stacks, the base addresses being stored in addressable memory locations in such addressable memory system in an order corresponding to the numbers assigned to the corresponding stacks;
(c) storing a base address of the base of said plurality of stack base addresses;
(d) storing a single word having a value identifying the number of the stack from which information is desired and at least one incremental value identifying the position of the desired word with reference to the base of the identified stack;
(e) combining the stored base address with the stack number value forming the address of one of said plurality of stack base addresses;
    (1) reading the stack base address from the memory system address identified by the last formed address, and
    (2) combining the last read base address with said at least one incremental value to form the address of the desired word of information from the identified stack.

14. In a programmed data processing system operative for processing words of information in a plurality of stacks in each of which words are stored on a first in, last out, basis and display registers are used to store absolute addresses of the beginning of predetermined stack areas in a stack currently in use establishing an addressing environment therefor, a method for obtaining a desired word of information comprising the steps of:

(a) storing in an addressable memory system of the data processing system a plurality of such stacks of words for processing;
(b) storing a base address of the one of such stacks currently in use;
(c) storing signals identifying a first increment value and a second increment value and a signal identifying whether the desired stack is or is not within the addressing environment established by the absolute addresses in such display registers;
(d) if the stored signal identifies that the desired stack is within the addressing environment of such display registers then;
    (1) utilizing the first increment value to select and obtain the absolute address from one of said display registers, and
    (2) combining the second increment value with the last obtained absolute address to form the address of the desired word, and
(e) if the stored signal identifies that the desired stack is not within the addressing environment of such display registers then;
    (1) combining the stored base address of the stack currently in use with said first and second increment value signals to form the absolute address of the desired word.

15. A method according to claim 14 including the steps of:

(a) storing in such addressable memory system a plurality of different program procedures for directing the operation of the data processing system and each being assigned a unique number;
(b) storing a plurality of procedure reference words one for each of said program procedures, each of said procedure reference words containing the absolute address of the base of the corresponding procedure, said procedure reference words being stored in a sequence of memory locations in such addressable memory system in an order corresponding to the number assigned to the corresponding procedure;
(c) storing the absolute address of the base of said plurality of procedure reference words; and
(d) storing a program control word in a plurality of said stacks each program control word having a number value corresponding to one of said procedures.

16. A method according to claim 15 wherein the address of the desired word is the address of one of said program control words and including the steps of:
(a) obtaining the program control word from such address;
(b) combining the stored number value in such program control word with the stored absolute address of the base of said procedure reference words to form the address of one of said procedure reference words; and
(c) obtaining the procedure reference word from the address formed in the preceding step.

17. In a programmed data processing system operative for processing words of information in a plurality of stacks in each of which words are stored on a first in, last out, basis and display registers are used to store absolute addresses of the beginning of predetermined stack areas in a stack currently in use establishing an addressing environment therefor, a method for obtaining a desired word of information from any one of the stacks comprising the steps of:
(a) storing in an addressable memory system of the data processing system a plurality of such stacks of words for processing, each of said stacks having a unique preassigned number;
(b) storing a plurality of stack base addresses, each stack base address being of the base of one of such stacks, the base addresses being stored in addressable memory locations in such addressable memory system in an order corresponding to the numbers assigned to the corresponding stacks;
(c) storing a base address of the base of said plurality of stack base addresses;
(d) storing a signal identifying the number of a desired stack, a signal identifying a first increment value, a signal identifying a second increment value and a signal identifying whether the desired stack is or is not within the addressing environment established by the absolute addresses in such display registers;
(e) if the stored signal identifies that the desired stack is within the addressing environment of such display registers then;
 (1) utilizing the first increment value to select one of said display registers and obtain the absolute address from such display register, and
 (2) combining the second increment value with such last obtained absolute address to form the address of the desired word; and
(f) if the stored signal identifies that the desired stack is not within the addressing environment of such display registers then combining said base address with the desired stack number signal to form an address of one of said stack base addresses and then,
 (1) reading out the stack base address from the last formed address, and
 (2) combining the stack base address with both said first and second increment value signals to form the absolute address of the desired word.

18. In a programmed data processing system operative for processing words of information in a plurality of stacks in each of which words are stored on a first in, last out, basis and display registers are used to store absolute addresses of the beginning of predetermined stack areas in a stack currently in use establishing an addressing environment therefor, a method for obtaining a desired word of information from any one of the stacks comprising the steps of:
(a) storing in an addressable memory system of the data processing system a plurality of such stacks of words for processing, each of said stacks having a unique preassigned number;
(b) storing a signal identifying the number of the one of such stacks currently in use;
(c) storing a base address of the one of such stacks currently in use;
(d) storing a plurality of stack base addresses, each stack base address being of the base of one of such stacks, the base addresses being stored in addressable memory locations in such addressable memory system in an order corresponding to the numbers assigned to the corresponding stacks;
(e) storing a further base address of the base of said plurality of stack base addresses;
(f) storing a signal identifying the number of a desired stack, a signal identifying a first increment value, a signal identifying a second increment value and a signal identifying whether the desired stack is or is not within the addressing environment established by the absolute addresses in such display registers;
(g) if the stored signal identifies that the desired stack is within the addressing environment of such display registers then;
 (1) utilizing the first increment value to select one of said display registers and obtain the absolute address from such display register, and
 (2) combining the second increment value with such last obtained absolute address to form the address of the desired word, and
(h) if the stored signal identifies that the desired stack is not within the addressing environment of such display registers then;
 (1) comparing the stored signal identifying the number of a desired stack and the signal identifying the stack currently in use,
 (2) if an equality is detected in the step of comparing then combining the stored base address of the stack currently in use with both said first and second increment value signals to form the absolute address of the desired word, and
 (3) if an inequality is detected in the step of comparing then combining said further base address with the desired stack number signal to form an address of one of said stack base addresses and then;
  (a) reading out the stack base address from the last formed address, and
  (b) combining the stack base address with both said first and second increment value signals to form the absolute address of the desired word.

19. A method according to claim 18 including the steps of:
(a) storing in such addressable memory system a plurality of different program procedures for directing the operation of the data processing system and each being assigned a unique number;
(b) storing a plurality of procedure reference words one for each of said program procedures, each of said procedure reference words containing the absolute address of the base of the corresponding procedure, said procedure reference words being stored in a sequence of memory locations in such addressable memory system in an order corresponding to the number assigned to the corresponding procedure;

(c) storing the absolute address of the base of said plurality of procedure reference words; and (d) storing a program control word in a plurality of said stacks each program control word having a number value corresponding to one of said procedures.

20. A method according to claim 19 wherein the address of the desired word of information is the address of one of said program control words and including the steps of:

(a) obtaining the program control word from such address;

(b) combining the stored number value in such program control word with the stored absolute address of the base of said procedure reference words to form the address of one of said procedure reference words; and (c) obtaining the procedure reference word from the address formed in the preceding step.

21. A data processing system operative for processing words of information in a plurality of stacks in which words of information are stored on a last in, first out, basis, comprising:

(a) an addressable memory system storing a plurality of such stacks of words for processing, each of said stacks having a unique preassigned number, said memory system storing a plurality of stack base addresses, each stack address being of the base of one of such stacks, the base addresses being stored in addressable memory locations in said addressable memory system in an order corresponding to the numbers assigned to the corresponding stacks;

(b) means for storing a signal identifying the number of the one of such stacks currently in use;

(c) means for storing a first base address of the base of the one of such stacks currently in use;

(d) means for storing a second base address of the base of said plurality of stack base addresses;

(e) means for storing a reference word containing a value identifying the number of the stack from which information is desired and containing at least one incremental value identifying the position of the desired word with reference to the base of the identified stack;

(f) means for comparing the stack number value of said reference word with the stored current stack number signal;

(g) means responsive to an equality in comparing for combining the stored base address of the stack currently in use with said at least one incremental value to form the address of the desired word of information in the stack currently in use;

(h) means responsive to an inequality in comparing for combining the second base address with the stack number value in said reference word forming the address of one of said plurality of stack base addresses;

(i) means for reading the stack base address from the memory system address identified by the last formed address; and (j) means for combining the last read base address with said at least one incremental value to form the address of the desired word of information from the identified stack.

22. A data processing system according to claim 21 wherein said stacks have a mark stack word at the base of each of a plurality of areas in said stacks, and wherein said incremental value contains a first incremental value identifying the displacement from the base of a desired stack to one of said mark stack words and a second increment value giving the displacement of the desired parameter from such mark stack word, wherein the combining means combines both said first and second increment values.

23. A data processing system having a hardware mechanism for processing words of information in a stack of words of information on a last in, first out, basis, comprising:

(a) an addressable memory system storing a plurality of such stacks of words for processing each of said stacks having a unique preassigned number and storing a plurality of stack base addresses, each stack base address being of the base of one of such stacks, the base addresses being stored in addressable memory locations in such addressable memory system in an order corresponding to the numbers assigned to the corresponding stacks;

(b) means for storing a base address of the base of said plurality of stack base addresses;

(c) means for storing a single word having a value identifying the number of the stack from which information is desired and at least one incremental value identifying the position of the desired word with reference to the base of the identified stack;

(d) means for combining the stored base address with the stack number value forming the address of one of said plurality of stack base addresses;

(e) means for reading the stack base address from the memory system address identified by the last formed address; and (f) means for combining the last read base address with said at least one incremental value to form the address of the desired word of information from the identified stack.

24. A programmed data processing system operative for processing words of information in a plurality of stacks on a first in, last out, basis comprising:

(a) an addressable memory system storing a plurality of such stacks of words for processing, each of said stacks having a unique preassigned number;

(b) a plurality of display registers each for storing the absolute address of the beginning of a predetermined stack area in a stack currently in use establishing an addressing environment for the display registers;

(c) means for storing a base address of the one of such stacks currently in use;

(d) means for storing signals identifying a first increment value and a second increment value and a signal identifying whether the desired stack is or is not within the addressing environment established by the absolute addresses in such diplay registers;

(e) means operative if the stored signal identifies that the desired stack is within the addressing environment of such display registers for utilizing the first increment value to select a display register and obtain the absolute address from such display register, and including means for combining the second increment value with the last obtained absolute address to form the address of the desired word; and (f) means operative if the stored signal identifies that the desired stack is not within the addressing environment of such display registers for combining the stored base address of the stack currently in use with said first and second increment value signals to form the absolute address of the desired word.

25. A data processing system according to claim 24 wherein said addressable memory system contains a plurality of different program procedures for directing the operation of the data processing system and each being assigned a unique number, and also contains a plurality of procedure reference words one for each of said program procedures, each of said procedure reference words containing the absolute address of the base of the corresponding procedure, said procedure reference words being stored in a sequence of memory locations in such addressable memory system in an order corresponding to the number assigned to the corresponding procedure; and including means for storing the absolute address of the base of said plurality of procedure reference words; and means for storing a program control word in a plurality of said stacks each program control word having a number value corresponding to one of said procedures.

26. A data processing system according to claim 25 wherein the address of the desired word of information is the address of one of said program control words and comprising:

(a) means for obtaining the program control word from such address;

(b) means for combining the stored number value in such program control word with the stored absolute address of the base of said procedure reference words to form the address of one of said procedure reference words; and (c) means for obtaining the procedure reference word from the address formed in the preceding step.

27. A programmed data processing system operative for processing words of information in a plurality of stacks in each of which words are stored on a first in, last out, basis comprising:

(a) an addressable memory system storing a plurality of such stacks of words for processing, each of said stacks having a unique preassigned number, said memory system storing a plurality of stack base addresses, each stack base address being of the base of one of such stacks, the base addresses being stored in addressable memory locations in said addressable memory system in an order corresponding to the numbers assigned to the corresponding stacks;

(b) a plurality of display registers each for storing the absolute address of the beginning of a predetermined stack area in a stack currently in use establishing an addressing environment therefor;

(c) means for storing a base address of the base of said plurality of stack base addresses;

(d) means for storing a signal identifying the number of a desired stack, a signal identifying a first increment value, a signal identifying a second increment value and a signal identifying whether the desired stack is or is not within the addressing environment established by the absolute addresses in such display registers;

(e) means operative if the stored signal identifies that the desired stack is within the addressing environment of such display registers for utilizing the first increment value to select one of said display registers and obtain the absolute address from such display register, and including means for combining the second increment value with such last obtained absolute address to form the address of the desired word; and (f) means operative if the stored signal identifies that the desired stack is not within the addressing environment of such display registers for combining said base address with the desired stack number signal to form an address of one of said stack base addresses and including;

(1) means for reading out the stack base address from the last formed address, and (2) means for combining the stack base address with both said first and second increment value signals to form the absolute address of the desired word.

28. A programmed data processing system operative for processing words of information in a plurality of stacks in each of which words are stored on a first in, last out, basis comprising:

(a) an addressable memory system storing a plurality of such stacks of words for processing, each of said stacks having a unique preassigned number, said memory system storing a plurality of stack base addresses, each stack base address being of the base of one of such stacks, the base addresses being stored in addressable memory locations in said addressable memory system in an order corresponding to the numbers assigned to the corresponding stacks;

(b) a plurality of display registers each for storing the absolute address of the beginning of a predetermined stack area in a stack currently in use establishing an addressing environment therefor;

(c) means for storing a signal identifying the number of the one of such stacks currently in use;

(d) means for storing a base address of the one of such stacks currently in use;

(e) means for storing a further base address of the base of said plurality of stack base addresses;

(f) means for storing a signal identifying the number of a desired stack, a signal identifying a first increment value, a signal identifying a second increment value and a signal identifying whether the desired stack is or is not within the addressing environment established by the absolute addresses in such display registers;

(g) means operative if the stored signal identifies that the desired stack is within the addressing environment of such display registers for utilizing the first increment value to select one of said display registers and obtain the absolute address from such display register, and including means for combining the second increment value with such last obtained absolute address to form the address of the desired word;

(h) means operative if the stored signal identifies that the desired stack is not within the addressing environment of such display registers for comparing the stored signal identifying the number of a desired stack and the signal identifying the stack currently in use and including, (1) means operative if an equality is detected in the step of comparing for combining the stored base address of the stack currently in use with both said first and second increment value signals to form the absolute address of the desired word, and (2) means operative if an inequality is detected for combining said further base address with the desired stack number signal to form an address of one of said stack base addresses and including (aa) means for reading out the stack base address from the last formed address, and (bb) means for combining the stack base address with both said first and second increment value signals to form the absolute address of the desired word.

29. A data processing system according to claim 28 wherein said addressable memory system contains a plurality of different program procedures for directing the operation of the data processing system and each being assigned a unique number and also contains a plurality of procedure reference words one for each of said program procedures, each of said procedure reference words containing the absolute address of the base of the corresponding procedure, said procedure reference words being stored in a sequence of memory locations in such addressable memory system in an order corresponding to the number assigned to the corresponding procedure; and including means for storing the absolute address of the base of said plurality of procedure reference words; and means for storing a program control word in a plurality of said stacks each program control word having a number value corresponding to one of said procedures.

30. *a* data processing system according to claim 29 wherein the address of the desired word of information is the address of one of said program control words and comprising:

(a) means for obtaining the program control word from such address;

(b) means for combining the stored number value in such program control word with the stored absolute address of the base of said procedure reference words to form the address of one of said procedure reference words; and (c) means for obtaining the procedure reference word from the address formed in the preceding step.

References Cited

UNITED STATES PATENTS

| | | | |
|---|---|---|---|
| 3,319,226 | 5/1967 | Mott et al. | 340—172.5 |
| 3,344,405 | 9/1967 | Craft et al. | 340—172.5 |
| 3,384,875 | 5/1968 | Bene et al. | 340—172.5 |
| 3,401,376 | 9/1968 | Barnes et al. | 340—172.5 |

PAUL J. HENON, Primary Examiner

S. R. CHIRLIN, Assistant Examiner

PO-1050
(5/69)

UNITED STATES PATENT OFFICE
CERTIFICATE OF CORRECTION

Patent No. 3,546,677 Dated June 21, 1971

Inventor(s) Robert S. Barton et al.

It is certified that error appears in the above-identified patent and that said Letters Patent are hereby corrected as shown below:

Col. 6, line 75, "tre" should read --the--; "corresponing" should read --corresponding--;

Col. 7, line 53, "soltue" should read --solute--;

Col. 7, line 65, "contians" should read --contains--;

Col. 9, line 58, "22" should read --22a--;

Col. 11, line 6, "R" should be "A";

Col. 11, line 28, "(i.e. IRWS)" should be deleted;

Col. 15, line 44, "stack" should read --stacks--.

Signed and sealed this 17th day of August 1971.

(SEAL)
Attest:

EDWARD M.FLETCHER, JR.
Attesting Officer

WILLIAM E. SCHUYLER, JR.
Commissioner of Patents